INVENTOR.
JOHN A. GAMMA
BY Nelson C. Cuddeback
ATTORNEY.

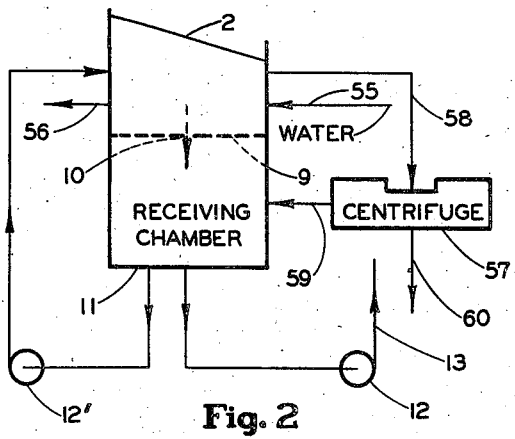
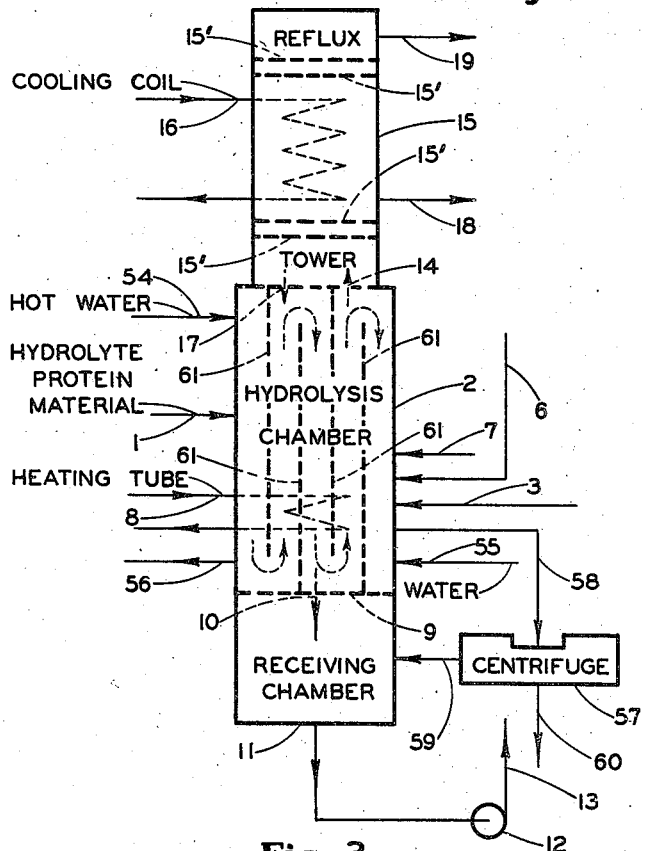

Patented Aug. 13, 1946

2,405,574

UNITED STATES PATENT OFFICE 2,405,574

PROCESS FOR THE MANUFACTURE OF AMINO ACIDS

John A. Gamma, Chicago, Ill., assignor to Bryn Mawr Laboratory, Chicago, Ill., a limited partnership of Illinois Application November 5, 1942, Serial No. 464,567

6 Claims. (Cl. 260—529)

This invention relates to a process for the manufacture of amino acids from proteins and from protein-containing materials, and, more particularly relates to the manufacture of monosodium glutamate therefrom.

The term protein is intended to include here all pure or nearly pure nitrogenous materials of the class comprising wheat gluten, gelatin, and casein as examples; and the term protein-containing materials is intended to include here all more or less impure proteins, that is, proteins in combination with other materials, of the class comprising wheat gluten flour containing substantial amounts of starch, pork skin, and whole dried milk as examples. The term protein material is intended hereinafter to include both proteins and protein-containing materials.

The methods used in the manufacture of amino acids, such as glutamic acid, as an example, from proteins and protein-containing materials at the present time involves difficulties in the handling of the materials, in processing, and in the matter of corrosion of equipment. It is therefore among the principal purposes of the present invention to provide procedures that will aid in overcoming these difficulties and, at the same time, give higher yields of product and more complete and economical recovery of processing material.

The method of preparing amino acids from proteins or from protein-containing materials by hydrolyzing them with inorganic acids and subsequently separating crystallizable amino acids or crystallizable amino acid derivatives from which the acids may be obtained, is well known to chemists. A prominent example of the use of this method, from a commercial standpoint, is the manufacture of glutamic acid from wheat gluten for use as a flavoring material in the form of its monobasic sodium salt. In this case, it has been the practice to use hydrochloric acid as a hydrolyzing agent, which, further, combines with the glutamic acid formed, producing the easily separable salt, glutamic acid hydrochloride. From an aqueous solution of this salt, the sparingly soluble glutamic acid can be precipitated by partial neutralization, separated in crystalline form and conveniently converted to monosodium glutamate by neutralization with sodium hydroxide, sodium carbonate or sodium bicarbonate.

The use of hydrochloric acid as a hydrolyzing agent involves the necessity of employing apparatus that is resistant to the corrosive action of this acid, such as glass, glass-lined or chemical stoneware apparatus. Limitations in size and prohibitive costs of such equipment, as well as other considerations, have prevented successful commercial application of the hydrochloric acid hydrolysis method to the manufacture of amino acids from raw materials that are relatively impure or bulky, such as corn gluten still containing substantial amounts of starch.

It is therefore another purpose of the present invention to facilitate the handling and processing of this type of bulky raw material, such as impure corn gluten, and to facilitate the disposal of the correspondingly large volume of waste residues resulting therefrom.

A further purpose of the present invention is to effect reduction in the size of the apparatus relative to the quantity of raw material in process, gaining thereby a reduction in initial cost of apparatus as well as reduction in apparatus surface exposed to acid corrosion. As a particular feature of this invention, I have found that by use of the invention disclosed, the weight of acid required per unit weight of raw material is less, and the acid is more economically recovered than by the customary method. I have also found as a feature of this invention that the solutions of hydrolyzed materials when produced by the process of this invention possess improved filtering and crystallizing properties, which brings about a reduction in processing time as compared with that required by the usual procedure.

It therefore may be considered as another purpose of my invention to reduce the weight of acid required per unit weight of raw material processed and to economically recover the acid used in processing and to reduce the processing time of the raw material into the resultant product by the method and apparatus to be hereinafter disclosed.

In the hydrolysis of proteins and other hydrolyzable materials containing proteins for the production of amino acids, it has heretofore been the practice to mix the material with liquid hydrochloric acid or other suitable acid such as sulphuric acid, and then to heat this hydrolyte mixture and keep it at an elevated temperature until hydrolysis is complete. Usually a solution of hydrochloric acid of about 20 per cent acid strength is used as the liquid phase of the mixture of acid and material to be hydrolyzed, this being the concentration at which a hydrochloric acid solution boils at the highest temperature, namely, at about 110° C., and also evaporates with no change in concentration of acid in the liquid phase.

In converting proteins and other hydrolyzable materials containing proteins into amino acids by my improved process, I employ, as a particular feature of my invention, the acid in vapor form by introducing the acid vapor directly into the mass of solid wet or dry material to be hydrolyzed or into a mixture of such material with water and/or acid. Such injection of acid vapor into the material to be hydrolyzed, I have found to be very effective in bringing about the hydrolysis of the material to amino acids, in giving a hydrolysate that filters well and one in which crystallization takes place easily. The injected acid vapor, which carries with it a large quantity of latent heat, is a very desirable means for keeping the hydrolyte mixture at an elevated temperature necessary for rapid hydrolysis. Another function of the injected vapor is the stirring or mixing effect produced by the rising and change in size of the bubbles of acid vapor. Such mixing and agitation keeps the solid particles in suspension, brings about close contact between hydrolyte and acid, and maintains good distribution of heat, all of which factors are essential for rapid and efficient hydrolysis. This mixing and agitating effect is, furthermore, so effective that mechanical stirring can be dispensed with entirely and the danger of corrosion of mechanical and electrical stirring equipment, attending the commonly employed method of hydrolysis, is completely eliminated. This novel method of heating and stirring with the acid vapor may also be considered as a principal object of my invention.

The introduction of condensable acid vapor into the hydrolyte mixture and the subsequent condensation of the vapor through contact with the hydrolyte mixture and with the cooler parts of the hydrolysis chamber, give rise to an accumulation of condensate in the hydrolysis chamber; and it is important, from the standpoint of economy in material consumption and in size of equipment, as well as for the maintenance of suitable acid concentrations, to keep such accumulation of acid vapor condensate at a minimum. To accomplish this, I make use of a filter as an integral part of the hydrolysis chamber as a means for conducting away the hydrolysate, or a part of the hydrolysate, which contains the acid vapor condensate. This filtered hydrolysate is conducted to an acid vapor boiler and acid vapor generated from it for injection into the hydrolysis chamber. Such filtration of the hydrolysate while hydrolysis is in progress brings about continuous removal of the amino acids that are brought into solution by the hydrolytic action, and continuous removal of other soluble interfering substances, such as soluble carbohydrates. Such removal of product from the region of formation is desirable from the standpoint of mass action, as well as for the purpose of obviating loss of product by further change that the product might undergo in the long heating period in the hydrolysis chamber. The novel use of a filter as an integral part of the hydrolysis chamber and the particular design thereof which will be described in detail later may also be considered as another object of my invention.

For the filtration of the hydrolysate, it is necessary to use a filtering medium, such as glass fibre or glass fibre fabric, that is resistant to the corrosive action of the acid. The agitation produced by the acid vapor jet can be used to serve another purpose also; namely, to prevent the formation of too deep a layer of hydrolyte solids at the filtering surface by keeping the solids in suspension, and hence to maintain uninterrupted and uniform filtration, which may be used as a particular feature of the novel apparatus, particularly in the hydrolysis chamber of this invention.

The passage of hydrolysate through the filter, the evaporation of the filtered hydrolysate in the acid vapor boiler, and the return of this vapor to the hydrolysis chamber where it is condensed, represent a continuous cycle of operations, that can be maintained during the entire period of hydrolysis. This particular novel continuous cycle of operations during the period of hydrolysis may be considered as another object of my invention.

The evaporation of the filtered hydrolysate in the acid vapor boiler reduces the volume of the evaporating liquid and increases the amino acid concentration therein. This concentrated hydrolysate can be withdrawn from the acid vapor boiler continuously or intermittently, as may be desired, and subjected to further processing for separation of the amino acids. This novel process of producing amino acids from a continuous cycle of operations as described above may also be considered as another purpose of my invention.

It is not intended, however, that the source of acid vapor be restricted to the evaporation of hydrolysate. Pure acid may be vaporized by any suitable means and introduced into the hydrolyte mixture as vapor, to supplement the vapor recovered from the evaporation of the hydrolysate. Acid as vapor may be recovered from other steps in the manufacture and used in the hydrolysis chamber, as illustrated in the example given herewith of the recovery of hydrochloric acid from glutamic acid hydrochloride mother liquor. Furthermore, it is not intended that acid vapor alone should be introduced into the hydrolysis mixture. Acid in liquid form may be introduced into the apparatus at any time to supplement the acid vapor, or to replenish such acid as may be removed or lost from the system.

In the usual methods heretofore used for the recovery of hydrochloric acid from protein hydrolysates and from glutamic acid hydrochloride mother liquor, these are evaporated and the acid vapor condensed in a conventional condenser. The heat of vaporization of the acid vapor is thus carried away by the cooling medium of the condenser and usually lost. In the method offered by this novel invention, the heat of vaporization is not lost, but is used directly for heating the hydrolyte mixture, which may also be considered as another object of my invention.

While it is possible to keep the hydrolyte mixture at the temperature at which hydrolysis proceeds readily, by using the heat carried by the injected vapors alone, it is not intended that my process be limited solely to this means of heating. In fact, it is desirable to use, in conjunction with the vapor heating, other means of applying heat to the hydrolyte mixture, such as a steam jacket or other types of heat exchange devices in that such supplementary means of heating facilitate regulation of the temperature, and supply additional heat for evaporation of excess water from the hydrolyte mixture. Such excess water may be carried into the system by the raw materials or by the acid, and is formed also as a product of the hydrolysis itself. Where it is desirable to maintain a given concentration of acid in the hydrolyte mixture, as, for example, the 20 per cent hydrochloric acid previously mentioned, removal of water from the system may be necessary. By employing a suitable refluxing column in conjunction with the preferred arrangement of apparatus for use with my process, a concentration of hydrochloric acid of approximately 20 per cent strength may be readily maintained in contact with the hydrolyte, and water of negligible acid content removed continuously and economically during the hydrolysis. This novel combination of a refluxing column or tower with the novel hydrolysis chamber to maintain this concentration of hydrochloric acid and operation thereof may also be considered as a particular feature of this invention.

The methods of the present invention, besides being applicable to batch procedure, make it possible also to use continuous procedure in the hydrolysis of proteins and protein-containing materials to amino acids, which may be considered as another feature of this novel invention.

In practicing the invention using batch operation, the hydrolysis chamber is charged with the hydrolyte material either as a solid or as a mixture with acid and/or water, acid vapor is introduced into the mass of hydrolyte material and the charge is kept at the optimum temperature for hydrolyzing the particular material until hydrolysis is complete. The hydrolysate is separated from the humus residue by continuing filtration through the hydrolysis chamber filter without further addition of acid as vapor or liquid to the hydrolysis chamber and the humus residue is washed with hot water and flushed away; or this hydrolysate can be filtered externally in a suitable filter or centrifuge which may or not be of the continuous type. Evaporization of the filtered hydrolysate supplies acid vapor for the succeeding batch.

When practicing the invention using extended batch, or semi-continuous operation, the addition of hydrolyte material to the hydrolysis chamber is continued as hydrolysis proceeds, until the quantity of humus residue in the chamber becomes too great to allow further successful operation. The run is then carried to completion by filtration as described for the batch procedure.

When the invention is practiced using continuous operation, hydrolyte material and acid vapor are fed continuously into the hydrolysis chamber and a portion of the hydrolyzed hydrolyte mixture is continuously allowed to escape therefrom, which escaping portion is filtered externally; and the resulting filtrate is combined with the filtrate from the hydrolysis chamber filter. The filtrates are evaporated and the vapor continuously recycled to the hydrolysis chamber. For use in a continuous procedure, the hydrolysis chamber may be provided with suitable baffles to reduce the loss of unhydrolyzed material in the escaping hydrolyte mixture.

The use of pneumatic stirring by means of the acid vapor jet, as results in the practice of this invention, gives greater freedom in the design of the hydrolysis chamber with an adequate number of baffles and with such baffles suitably placed, than if mechanical stirring were used, and the loss of unhydrolyzed material can easily be reduced to an inconsiderable value. However, it is also within the scope of this invention that mechanical stirring may be used, although it is preferred to use pneumatic stirring because of the attendant savings in equipment because of excessive corrosion.

In practicing the present invention, I have found that hydrolysis proceeds more readily and that filtration is facilitated by the incorporation of a portion of the humus residue from a preceding batch with the hydrolyte mixture. This fact makes it desirable to use this novel process in a continuous operation, although it is within the scope of my invention to use this process either as a batch or semi-continuous operation.

Further purposes and advantages will become apparent hereinafter, especially in view of the disclosure of my invention with respect to the accompanying drawings, wherein like reference characters will denote similar apparatus.

Referring to the drawings:

Figure 2 is a diagrammatic view illustrating a modification of the hydrolysis chamber used in the arrangement of the apparatus of Figure 1, wherein filtration may be facilitated by maintaining a vacuum by suitable means in the receiving chamber of the hydrolyzing apparatus;

Figure 3 is a modification of a preferred form of the novel hydrolyzing apparatus of Figure 1, as modified for use in the continuous process, and illustrating diagrammatically a centrifuge for filtering the escaping hydrolyte mixture in practicing the invention as illustrated diagrammatically in Figure 1.

Figure 1:
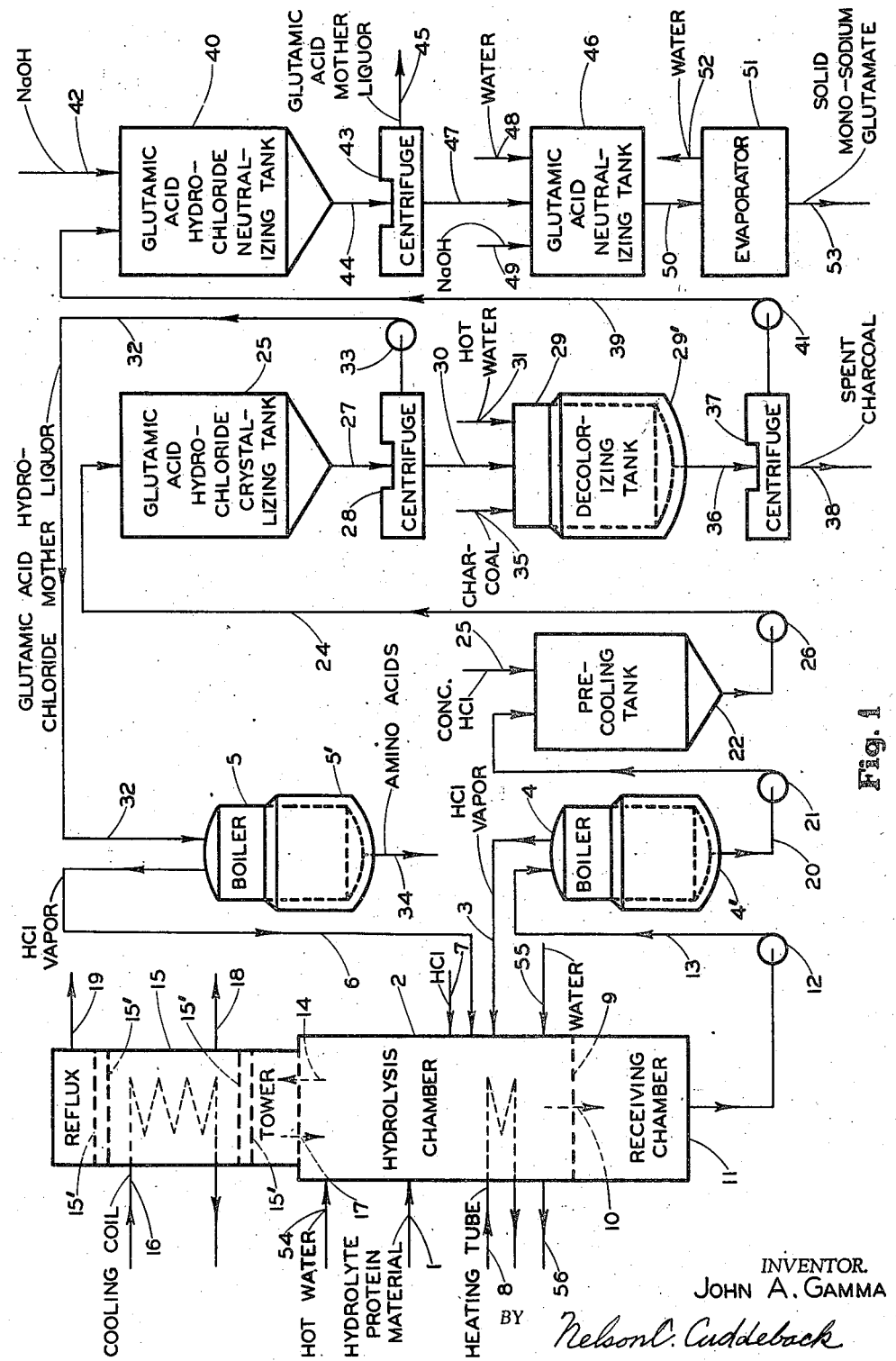
Figure 1 is a flow diagram illustrating the preferred arrangement of apparatus for practicing the invention in the production of amino acids and particularly in the production of glutamic acid and/or mono-sodium glutamate by the hydrolysis of suitable protein material, such as wheat gluten or corn gluten, with hydrochloric acid by the batch process or by the semi-continuous process.

It is to be understood that the applications of the methods of this invention, however, are not to be limited to the production of glutamic acid or its derivatives and the complete flow diagram presented herewith together with the modifications thereof as illustrated in Figures 1, 2 and 3 serve only as an illustrative example of a general process and apparatus therefor within the scope of the appended claims.

Referring to the drawings, line 1 supplies protein material to be hydrolyzed to a novel form of hydrolysis chamber 2. The material may be fed in solid form or as a fluent mixture of the solid material with hydrochloric acid and/or water, there being preferably, but not necessarily, still present in the hydrolysis chamber some of the humus residue or unfiltered hydrolysate of a previous batch or run. Simultaneously with the introduction of protein material, there is supplied to the hydrolysis chamber 2 through line 3 hydrochloric acid vapor from a boiler 4, this vapor being produced by evaporation of liquid hydrolysate in boiler 4 by the application thereto of heat supplied by suitable means, such as a steam jacket 4'. In place of hydrochloric acid vapor from boiler 4, or together with it, there may be fed into the hydrolysis chamber 2, hydrochloric acid vapor from boiler 5, through line 6, this vapor being produced by evaporation of glutamic acid hydrochloride mother liquor in boiler 5, the heat being supplied to the boiler 5 by suitable means such as a steam jacket 5'.

Hydrochloric acid in liquid form, to supplement the hydrochloric acid supplied as vapor from the boilers 4 and 5, may be fed to the hydrolysis chamber 2 through a line 7 from a storage tank suitably located. The line 7 may also supply hydrochloric acid for starting the process.

The hydrolyte mixture of protein material and liquid hydrochloric acid in the hydrolysis chamber 2 is heated and kept at the boiling point by means of both the heat carried by the vapor supplied by the lines 3 and 6 and by the heat exchange tube 8 or other form of heat exchange means.

Referring to Figures 1, 2 and 3, the liquid hydrolysate passes through an hydrolysis chamber filter 9 as stream 10 into an hydrolysate receiving chamber 11. It is preferred that the hydrolysis chamber filter 9 shall be formed of glass fibre or glass fibre fabric or other materials that are resistant to the corrosive action of the acid. The agitation produced by the acid vapor jets from lines 3 and 6 may be used to serve another useful purpose, namely to prevent the formation of too deep a layer of hydrolyte solids at the filtering surface by keeping the solids in suspension and thereby maintaining uninterrupted and uniform filtration. Referring to the modification in Figure 2, filtration may be facilitated by maintaining a vacuum in the receiving chamber 11 by suitable means as by a pump or ejector 12' which returns the acid vapors from the hydrolysate receiving chamber 11 to the hydrolysis chamber 2. The filtered hydrolysate is withdrawn from the receiving chamber 11 and supplied to the boiler 4 by means of a pump 12 through a line 13 continuously or intermittently, as may be desired.

In the hydrolysis process, the vapor escaping from the surface of the hydrolyte mixture in the hydrolysis chamber 2 passes as stream 14 into a refluxing and/or fractionating tower 15 cooled by suitable cooling means such as coils 16. The hydrochloric acid concentration of the liquid phase in the hydrolyte mixture in the hydrolysis chamber 2 is maintained at that of the constant boiling hydrochloric acid solution; namely, at about 20 percent by supplying hydrochloric acid as vapor through the lines 3 and 6 and as liquid through the line 7, and by supplying enough heat through the heat exchange tube 8 or by other heat exchange means to effect sufficient evaporation. The temperature of the boiling hydrolyte mixture will vary in the neighborhood of 110° C., the variation depending principally on the nature of the protein material being used. Hydrochloric acid of nearly the concentration of that of the constant boiling mixture refluxes back into the hydrolysis chamber as stream 17, while weak acid or water is drawn off through lines 18 and 19 and stored in suitable tanks for washing of the humus residue. The reflux tower 15 may be suitably baffled by baffles or plates 15'.

It is also desirable to use in conjunction with the vapor heating other means of applying heat to the hydrolyte mixture such as a jacket or other types of heat exchange devices 8, in that such supplementary means of heating facilitate regulation of the temperature, and supply additional heat for evaporation of the excess water from the hydrolyte mixture. This excess water may be carried into the system by the raw materials or by the acid, and is formed also as a product of the hydrolysis itself. Where it is desirable to maintain a given concentration of acid in the hydrolyte mixture, as for example the 20 per cent hydrochloric acid mentioned above, removal of the water from the system may be necessary and is facilitated as described with respect to the lines 18 and 19. With the refluxing column described above in conjunction with the preferred arrangement of apparatus for use with the process, this concentration of hydrochloric acid of approximately 20 per cent strength may be readily maintained in contact with the hydrolyte and the water of negligible acid content may be removed continuously and economically during the hydrolysis process.

Since the boiler 4 is heated by suitable means such as the steam jacket 4', the hydrochloric acid and water content of the hydrolysate supplied by the line 13 to the boiler 4 is reduced by evaporation and discharged as hydrochloric acid vapor to the hydrolysis chamber 2 by the line 3. The concentrated hydrolysate is drawn off through a line 20 and directed to a precooling tank 22 by a pump 21 and associated lines connecting the pump and the tank. Concentrated hydrochloric acid of 37 per cent strength is supplied to a precooling tank 22 through a line 23 and is allowed to mix with the concentrated hydrolysate. The acidified concentrated hydrolysate is directed from the precooling tank 22 through a line 24 to a glutamic acid hydrochloric crystallizing tank 25 by means of a pump 26. A line 27 carries the glutamic acid hydrochloride magma to a centrifuge 28 which may be either of the batch or continuous type, which separates the crude glutamic acid hydrochloride crystals from glutamic acid hydrochloride mother liquor. The crude crystallized glutamic acid hydrochloride is discharged into a decolorizing tank 29 through a line 30 and there dissolved in hot water from line 31, whereas the glutamic acid hydrochloride mother liquor is directed through a line 32 to the boiler 5 by a pump 33, where the greater part of the hydrochloric acid content is recovered by evaporation and which hydrochloric acid vapor is injected into the hydrolysis chamber 2 through the line 6. The boiler 5 is heated by suitable means such as the steam jacket 5', previously described.

The evaporation of the glutamic acid hydrochloride mother liquor in the boiler 5 reduces it to a concentrated syrupy material containing the amino acids other than glutamic acid. This concentrate of amino acids is drawn off through a line 34 and may be treated by suitable means not described with reference to this particular example for the recovery of these amino acids and other constituents.

The glutamic acid hydrochloride in water solution is boiled with decolorizing charcoal supplied by a line 35 to the decolorizing tank 29, which is heated by suitable means, such as, for example, a steam jacket 29'; and, the decolorized solution is run off through a line 36 to a centrifuge or filter 37, where the spent charcoal is discharged as stream 38, and the decolorized glutamic acid hydrochloride solution is directed through a line 39 to a glutamic acid hydrochloride neutralizing tank 40 by means of a pump 41.

The neutralizing agent, sodium carbonate, sodium bicarbonate or sodium hydroxide, is supplied through a line 42 in sufficient quantity to convert the glutamic acid hydrochloride to glutamic acid, whereby the sparingly soluble crystalline glutamic acid is formed and settles in the tank 40. A centrifuge or filter 43 providing filtering means, supplied with glutamic acid magma by a line 44, separates the glutamic acid mother liquor from the crystalline glutamic acid as stream 45 and delivers the glutamic acid to a glutamic acid neutralizing tank 46 through a line 47. The glutamic acid may also be separated from the mother liquor by decantation means in lieu of using the centrifuge or filter 43 and is considered as an equivalent means within the scope of this invention.

In the neutralizing tank 46, the glutamic acid is brought into solution with water supplied by a line 48 and neutralized to mono-sodium glutamate with a sufficient quantity of sodium hydroxide, sodium carbonate or sodium bicarbonate supplied through line 49. The mono-sodium glutamate solution is conducted through a line 50 to a suitable dryer or evaporator 51, generically called a drying means within the scope of this invention, which removes sufficient water as stream 52 to produce solid mono-sodium glutamate as stream 53.

In this novel process, operating the apparatus as disclosed above either as a batch or semi-continuous process, when the charge of hydrolyte in the hydrolysis chamber 2 has been hydrolyzed to the extent desired in the batch or semi-continuous operation, the humus residue is separated from the liquid hydrolysate by allowing the hydrolysate to continue to filter and drain off through the hydrolysis chamber filter 9 as the stream 10 and following by sufficient washing with hot water from line 54, the washings being filtered as stream 10 and combined with the hydrolysate in the receiving chamber 11. The drained humus residue may then be flushed from the hydrolysis chamber 2 with water from line 55 as stream 56. As illustrated in Figure 2, these operations may be facilitated by employing a centrifuge 57 to which the hydrolyte mixture from the hydrolysis chamber 2 is fed through a line 58, and which the centrifuge 57 discharges filtered hydrolysate to the hydrolysate receiving chamber 11 through a line 59; and humus residue as stream 60. Referring to Figure 2, the centrifuge 57 serves as an emptying filtration means in the batch process; and, particularly in the continuous process, referring to Figure 3, the centrifuge 57 serves as a filtering means for the escaping hydrolyte, though when necessary it also serves as an emptying filtration means as disclosed with respect to Figure 2.

In practicing the invention using batch operation, as disclosed above in detail with reference to Figures 1 and 2, the hydrolysis chamber 2 is charged with the hydrolyte protein material either as a solid or as a mixture with acid and/or water through the line 1, and acid vapor is introduced into the mass of the hydrolyte protein material through the lines 3 and 6. The charge is kept at the optimum temperature for hydrolyzing the particular material until hydrolysis is complete. The hydrolysate is separated from the humus residue by continuing filtration through the hydrolysis chamber filter 9 without further addition of acid as vapor or liquid to the hydrolysis chamber 2, and the humus residue is washed with hot water from the line 54, as described above, and flushed away through line 56 with water from the line 55 or, as alternately described, this hydrolysate can be filtered externally in a suitable filter or centrifuge 57. The evaporation of the filtered hydrolysate as discharged into the boiler 4 from the hydrolyte receiving chamber 11 supplies acid vapor for the succeeding batch.

In the practice of the invention using extended batch or semi-continuous operation, the addition of hydrolyte material through the line 1 to the hydrolysis chamber 2 is continued as hydrolysis proceeds, until the quantity of the humus residue in the hydrolysis chamber 2 becomes too great to allow further successful operation. The run is then carried to completion by filtration as described above for the batch procedure.

When the invention is practiced using continuous operation, hydrolyte material and acid vapor are fed continuously into the hydrolysis chamber 2 through respectively line 1 for the hydrolyte protein material and lines 3 and 6 for the acid vapor; and a portion of the hydrolyzed hydrolyte mixture is continuously allowed to escape therefrom, referring to Figure 3, through line 58 to the centrifuge 57 in which the escaping portion of the hydrolyzed hydrolyte mixture is filtered externally. The resulting filtrate is discharged to the hydrolysate receiving chamber 11 through the line 59 from the centrifuge 57 and combined with the filtrate discharged through the hydrolysis chamber filter 9 as stream 10. The combined filtrates are evaporated and the acid vapor continuously recycled to the hydrolysis chamber 2. For use in this continuous procedure, the hydrolysis chamber 2, as illustrated in Figure 3, may be provided with suitable baffles 61 to reduce the loss of unhydrolyzed material in the escaping hydrolyte mixture.

In practicing the invention as a continuous operation, the use of pneumatic stirring by means of the acid vapor jets, as provided by the lines 3 and 6, gives greater freedom in the design of hydrolysis chamber 2 with an adequate number of the baffles 61 suitably placed, with reference to the continuous process in the modification of Figure 3, than if mechanical stirring were used; and the loss of unhydrolyzed material can be reduced to an inconsiderable volume. However, it is also within the scope of this invention to use as an equivalent method of stirring, if necessary, mechanical stirring and/or the combination of mechanical stirring and pneumatic stirring in the different methods of operation such as batch, extended batch or continuous operation, although it is preferred in the continuous operation to use the pneumatic stirring of the acid vapor jets discharged from lines 3 and 6. Pneumatic stirring of the acid vapor jets may be used also either in the batch operation or the extended batch operation. Although in the disclosure of this invention with respect to the batch, extended batch or continuous operation, the heating means for the hydrolysis chamber have been disclosed as heating coils or tubes 8, it is entirely within the scope of this invention that other equivalent heating means may be used without departing from the scope of the invention.

With respect to any of these operations, it will be obvious to one skilled in the techniques involved in the manufacture of amino acids from protein material and particulary of glutamic acid as manufactured from protein material, that the neutralization of glutamic acid hydrochloride to glutamic acid, and the neutralization of glutamic acid to mono-sodium glutamate, as well as the use of the insolubility of glutamic acid hydrochloride in hydrochloric acid and the use of the slight solubility of glutamic acid in water at low temperatures, for separating these compounds, are techniques in common use and are carried out as described above with reference to the novel process and apparatus diagrammatically illustrated and described with reference to Figures 1, 2 and 3.

As will be obvious to those skilled in the art and with the techniques involved in the manufacture of amino acids from protein material and particularly of glutamic acid as manufactured from protein material, that the neutralization of glutamic acid hydrochloride to glutamic acid, and the neutralization of glutamic acid to mono-sodium glutamate, as well as the use of the insolubility of glutamic acid hydrochloride in hydrochloric acid and the use of the slight solubility of glutamic acid in water at low temperatures, for separating these compounds, are techniques in common use, and no claim is made in this invention to these procedures with the exception as they form a new and novel combination with the novel process and apparatus therefor for hydrolyzing protein material, and/or for the recycling of hydrochloric acid vapor from the evaporation of hydrolysate and of glutamic acid hydrochloride mother liquor.

It is also obvious to one skilled in the art that I have disclosed a novel method and particular apparatus for the manufacture of amino acids, particularly of glutamic acid for use as a flavoring material in the form of its mono-basic sodium salt. Glutamic acid as disclosed in this invention designates a crystalline nitrogenous acid $C_3H_3NH_2(CO_2H)_2$ and also may be written as $COOH(CH_2)_2CH(NH_2)COOH$ existing in three optical forms; and, the dextro variety, which is particularly desired, occurs in certain plants and is also obtained as disclosed above by the hydrolysis of wheat or corn gluten or equivalent protein material. It is particularly mono-sodium glutamate, or the mono-basic sodium salt of the dextro variety of glutamic acid, which is desired for artificial flavoring.

While I have described particular embodiments of my invention for the purpose of illustration, it should be understood that various modifications and adaptations thereof, which will be obvious to one skilled in the art, may be made within the scope of the invention as set forth in the appended claims.

What is claimed is:

1. In the manufacture of amino acids from protein material, the process, which comprises: subjecting said material to hydrolysis by introducing the vapor of hydrochloric acid into a mass of said material, allowing the acid vapor to condense in contact with said material, filtering the resulting hydrolyte mixture while the hydrolysis is in progress to separate the hydrolysate from the solid residue, evaporating this filtered hydrolysate and recycling the hot acid vapor resulting from said evaporation into the hydrolyte mixture during hydrolysis.

2. In the manufacture of amino acids from protein material, the process, which comprises: subjecting said material to hydrolysis by introducing the vapor of hydrochloric acid into a mass of said material, allowing the hydrochloric acid vapor to condense in contact with said material, keeping the resulting hydrolyte mixture at the boiling point of the constant boiling mixture of hydrochloric acid, namely, at about 110° C., by sufficiently evaporating the hydrolyte mixture during hydrolysis, filtering the resulting hydrolyte mixture while the hydrolysis is in progress to separate the hydrolysate from the solid residue, evaporating the filtered hydrolysate, and recycling the hot hydrochloric acid vapor resulting from this evaporation into the hydrolyte mixture during hydrolysis.

3. In the manufacture of amino acids from protein material, the process, which comprises: subjecting said material to hydrolysis by introducing the vapor of hydrochloric acid into a mass of said material, allowing part or all of the hydrochloric acid vapor to condense in contact with said material, keeping the resulting hydrolyte mixture at the boiling point of the constant boiling mixture of hydrochloric acid, namely, at about 110° C., by sufficiently evaporating the hydrolyte mixture during hydrolysis, filtering the resulting hydrolyte mixture while the hydrolysis is in progress to separate the hydrolysate from the solid residue, evaporating the filtered hydrolysate, recycling the hot hydrochloric acid vapor resulting from this evaporation into the hydrolyte mixture during hydrolysis, and introducing in addition hot hydrochloric acid vapor from the evaporation of glutamic acid hydrochloride mother liquor into the hydrolyte mixture during hydrolysis.

4. In the manufacture of glutamic acid from protein material, the process, which comprises: subjecting said material to hydrolysis by introducing the vapor of hydrochloric acid into a mass of said material, allowing the acid vapor to condense in contact with said material, filtering the resulting hydrolyte mixture while the hydrolysis is in progress to separate the hydrolysate from the solid residue, evaporating this filtered hydrolysate and recycling the hot acid vapor resulting from said evaporation into the hydrolyte mixture during hydrolysis in a manner causing agitation of the hydrolysis mixture, cooling the said concentrated hydrolysate, adding concentrated hydrochloric acid to form glutamic acid hydrochloride crystals, separating these glutamic acid hydrochloride crystals from their mother liquor by filtration, purifying them by decolorizing with activated charcoal and by recrystallization, and neutralizing the purified glutamic acid hydrochloride to glutamic acid by adding a suitable base selected from the class consisting of sodium hydroxide, sodium carbonate, and sodium bicarbonate.

5. In the manufacture of amino acids from protein material, the process, which comprises: subjecting said material to hydrolysis by introducing the vapor of hydrochloric acid into a mass of said material, allowing the acid vapor to condense in contact with said material, filtering the resulting hydrolyte mixture while the hydrolysis is in progress to separate the hydrolysate from the solid residue, evaporating this filtered hydrolysate and recycling the hot acid vapor resulting from said evaporation into the hydrolyte mixture during hydrolysis, cooling the said concentrated hydrolysate, adding concentrated hydrochloric acid to form glutamic acid hydrochloride crystals, filtering the glutamic acid hydrochloride magma to form glutamic acid hydrochloride crystals, evaporating the glutamic acid hydrochloride mother liquor from the aforesaid step of filtering to give hydrochloric acid vapor and a concentrate of amino acids, and recycling the hydrochloric acid vapor to further subject the protein material to hydrolysis by introducing the hydrochloric acid vapor to condense in contact with said material.

6. In the manufacture of mono-sodium glutamate from protein material, the process, which comprises: subjecting said material to hydrolysis by introducing the vapor of hydrochloric acid into a mass of said material, allowing the acid vapor to condense in contact with said material, filtering the resulting hydrolyte mixture while the hydrolysis is in progress to separate the hydrolysate from the solid residue, evaporating this filtered hydrolysate and recycling the hot acid resulting from said evaporation into the hydrolyte mixture during hydrolysis, adding concentrated hydrochloric acid to the concentrated hydrolysate to form solid glutamic acid hydrochloride, filtering the glutamic acid hydrochloride from its mother liquor, evaporating the glutamic acid hydrochloride mother liquor from the aforesaid step of filtering to form a concentrate of amino acids, and recycling the hydrochloric acid vapor from the aforesaid step of evaporating for further hydrolysis of the protein material, decolorizing in a water solution the crude crystallized glutamic acid hydrochloride, filtering the decolorized glutamic acid hydrochloride solution and neutralizing with a sodium base to form a glutamic acid magma, filtering the glutamic acid magma to form glutamic acid and glutamic acid mother liquor, dissolving the glutamic acid in water and neutralizing it with a suitable base from the class consisting of sodium hydroxide, sodium carbonate or sodium bicarbonate, forming mono-sodium glutamate, and evaporating the mono-sodium glutamate solution forming solid mono-sodium glutamate.

JOHN A. GAMMA.